(12) United States Patent
Duong

(10) Patent No.: US 8,993,079 B1
(45) Date of Patent: Mar. 31, 2015

(54) INSULATED FOAM BAG AND FABRICATION METHOD

(71) Applicant: Coldpack, Inc., San Diego, CA (US)

(72) Inventor: Alice K. Duong, San Diego, CA (US)

(*) Notice: Subject to any disclaimer, the term of this patent is extended or adjusted under 35 U.S.C. 154(b) by 170 days.

(21) Appl. No.: 13/867,902

(22) Filed: Apr. 22, 2013

Related U.S. Application Data

(60) Provisional application No. 61/636,127, filed on Apr. 20, 2012.

(51) Int. Cl.
*B29D 22/00* (2006.01)
*B29D 23/00* (2006.01)
*B32B 1/08* (2006.01)
*B65D 81/38* (2006.01)
*B32B 15/04* (2006.01)
*B32B 15/08* (2006.01)
*B29C 65/00* (2006.01)
*B29C 65/02* (2006.01)

(52) U.S. Cl.
CPC .............. *B65D 81/3897* (2013.01); *B32B 15/04* (2013.01); *B32B 15/08* (2013.01); *B29C 66/4312* (2013.01); *B32B 1/08* (2013.01); *B29C 65/02* (2013.01); *B29C 66/41* (2013.01)

USPC ........... 428/35.3; 428/36.5; 383/84; 383/110; 156/285; 156/286; 156/287; 156/292

(58) Field of Classification Search
CPC .......... B32B 15/04; B32B 15/08; B32B 1/08; B29C 65/02; B29C 66/41; B29C 66/4312; B29D 22/00; B29D 23/00
USPC ........... 428/35.3, 36.5; 383/110, 84; 156/285, 156/286, 287, 292
See application file for complete search history.

(56) References Cited

U.S. PATENT DOCUMENTS

2004/0120611 A1* 6/2004 Kannankeril et al. ........ 383/110

* cited by examiner

*Primary Examiner* — Michael C Miggins

(57) ABSTRACT

An insulated container includes a first laminated structure having a metal layer and a second laminated structure having a metal layer. The metal layer of the first laminated structure faces the metal layer of the second laminated structure. The insulated container also includes a foam material layer disposed between the first laminated structure and the second laminated structure. The metal layer of the first laminated structure is bonded to the metal layer of the second laminated structure at a plurality of locations.

11 Claims, 8 Drawing Sheets

INSULATED FOAM BAG AND FABRICATION METHOD

CROSS-REFERENCES TO RELATED APPLICATIONS

This application claims priority to U.S. Provisional Patent Application No. 61/636,127, filed on Apr. 20, 2012, entitled "Insulated Foam Bag and Fabrication Method," the disclosure of which is hereby incorporated by reference in its entirety for all purposes.

BACKGROUND OF THE INVENTION

In some shipping applications, it is desirable to utilize packaging products that maintain products inside the packaging materials at or below a predetermined temperature, thus keeping temperature sensitive objects safe during the shipping process. As an example, food products, pharmaceuticals, and the like, can be refrigerated or maintained at a temperature greater than the ambient temperature during shipping. A variety of packaging products have been developed to provide thermal insulation during shipping.

Despite the progress in the field of packaging technology, there is a need in the art for improved methods and systems related to thermal insulation of packaging products.

SUMMARY OF THE INVENTION

The present invention relates generally to packaging technology. More particularly, embodiments of the present invention relate to methods and systems for fabricating insulated containers. Merely by way of example, the present invention has been applied to the fabrication of an insulated bag including a foam material and adapted to form a box-shaped structure. The invention has wider applicability than this example and is suitable for application to other packaging applications.

According to an embodiment of the present invention, an insulated container is provided. The insulated container, which can be used to control the internal temperature of an enclosed volume, includes a first laminated structure having a metal layer and a second laminated structure having a metal layer. The metal layer of the first laminated structure faces the metal layer of the second laminated structure. The insulated container also includes a foam material layer disposed between the first laminated structure and the second laminated structure. The metal layer of the first laminated structure is bonded to the metal layer of the second laminated structure at a plurality of locations.

According to another embodiment of the present invention, a method of fabricating an insulated metalized container is provided. The method includes providing a metalized bag comprising a laminated material including an outer layer and an inner layer comprising a metal layer, inserting a foam material into the metalized bag, and heat sealing a portion of the metalized bag using a heat seal pattern. The method also includes inserting a vacuum release port between the foam material and the metalized bag and heat sealing a remaining portion of the metalized bag to form the insulating metalized container. The method further includes forming a reduced pressure environment inside the insulating metalized container.

Numerous benefits are achieved by way of the present invention over conventional techniques. For example, embodiments of the present invention provide an insulated container that is collapsible for shipping and re-expandable upon use, reducing shipping volume and cost. Additionally, embodiments of the present invention provide unique laminated structures in which metal-to-metal bonds are used to heat seal the structure. These and other embodiments of the invention along with many of its advantages and features are described in more detail in conjunction with the text below and attached figures.

DETAILED DESCRIPTION OF SPECIFIC EMBODIMENTS

The present invention relates generally to packaging technology. In an embodiment described herein, methods and systems are provided to fabricate a bag including a foam material of a certain thickness that is shaped so that the bag can become a box when formed inside of a corrugated box. In other implementations, the foam can be cut to form a pouch for flat shipments. In some embodiments, portions cut out of the box shape illustrated in FIG. 1 can be used to form pouches, reusing sections that would normally be discarded.

As described herein, embodiments utilize a custom cut piece of foam material having a predetermined thickness that works in conjunction with film layers to form an insulating structure. As an example, the custom piece of foam can be entrapped between two layers of metalized film. In a particular embodiment, the metalized surface of the inner and outer film layers are facing each other, providing the benefit of increasing reflection and therefore increasing thermal insulating performance. As described herein, the outer film can be metalized on both sides. The inner and outer film layers can be coextruded structures incorporating low melting point plastics providing a structure such as: metalized film/air barrier/high melting point plastic so that the structure can be metalized or custom printed.

During the manufacturing process, the bag is vacuum sealed, providing for a decrease in the physical volume of the bag for ease of shipping. Using a valve structure, the bag can be filled with a gas, enabling the bag to regain its original thickness, as well as any 3D shape associated therewith when the point of entry is separated (e.g., by use of the valve). Strategic heat seals are positioned to facilitate folding of the foam material and all layers can be sealed at critical and strategic locations to achieve the desired shape.

The insulating container can be used in conjunction with a variety of gases, including air, clean dry air, argon, carbon dioxide, combinations thereof, or other suitable gases to provide for increases in thermal performance in comparison with other designs. As described herein, since air inside the insulated container can be removed by a vacuum process during manufacturing, the product can ship to customers at a smaller physical volume than the volume during use, providing space and costs savings for shipping.

Figure 1:
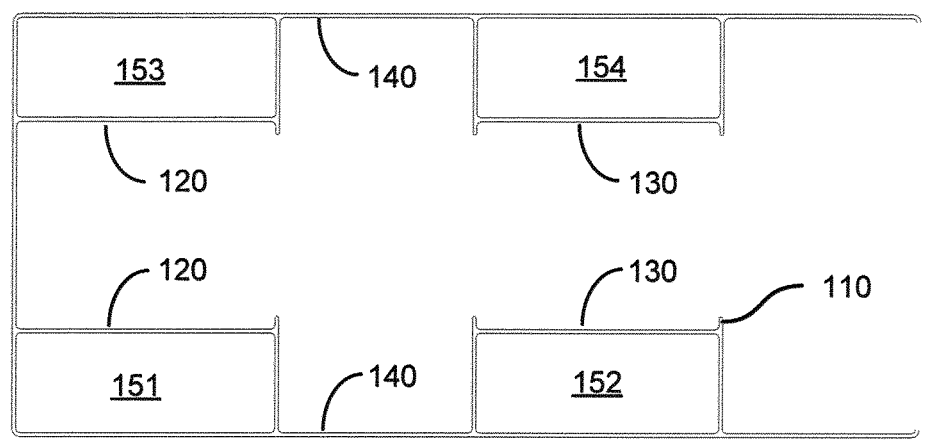
FIG. 1 is schematic diagram illustrating a heat sealing pattern for a metalized inner and outer film, providing an insertion section for a foam material according to an embodiment of the present invention.

FIG. 1 is schematic diagram illustrating a heat sealing pattern for a metalized inner and outer film, providing an insertion section for a foam material according to an embodiment of the present invention. As illustrated in FIG. 1, the manufacturing method includes heat sealing the metalized inner and outer film, thereby leaving an insertion section for the foam. As described herein, embodiments of the present invention utilize a process in which a metalized film is heat sealed, with the metalized film trapped inside the film material. FIG. 1 illustrates how the film will be heat sealed with the metalized sides of the film facing each other (i.e., the heat seal pattern). Referring to FIG. 1, the heat seal pattern 110 includes sections 120 and 130 that define extension sections 140. The dimensions of sections 120, 130, and 140 are predetermined values that, as will be described more fully below, define the dimensions of the insulated container, also referred to as a foam bag illustrated herein. Four regions 151, 152, 153, and 154 are illustrated and can be associated with dies or punches that are used to remove portions of the metalized bag during the fabrication process. As described more fully below, in order to provide a peripheral shape suitable for folding into a box, the four regions 151, 152, 153, and 154 can be cut out after the heat sealing is performed. One of ordinary skill in the art would recognize many variations, modifications, and alternatives.

Figure 2A:
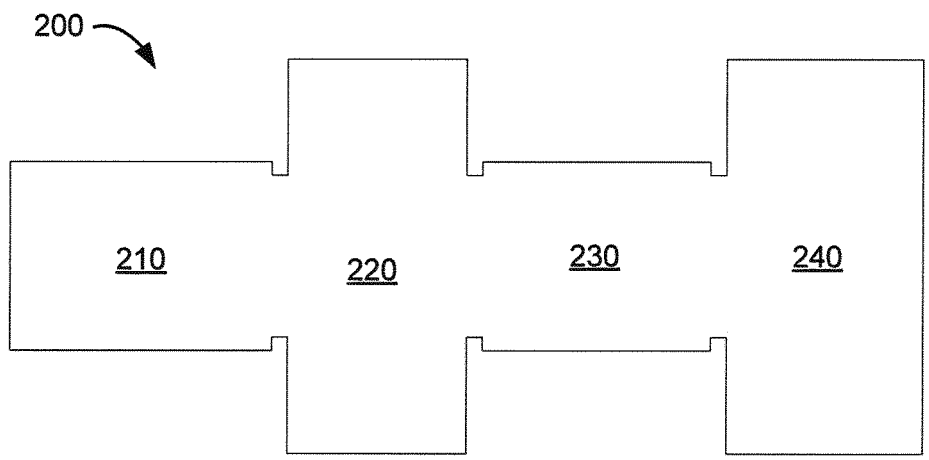
FIG. 2A is a schematic diagram illustrating a shape associated with the foam material according to an embodiment of the present invention.

FIG. 2A is a schematic diagram illustrating a shape associated with the foam material according to an embodiment of the present invention. As shown in FIG. 2A, the foam material 200 is cut to size as appropriate to be inserted in the metalized film that is subsequently heat sealed using the heat seal pattern 110 illustrated in FIG. 1. Adhesive/press-to-close/hooks and loops closures can be added for hermetic closure of the bag during use to prevent liquid leakage.

Figure 2B:
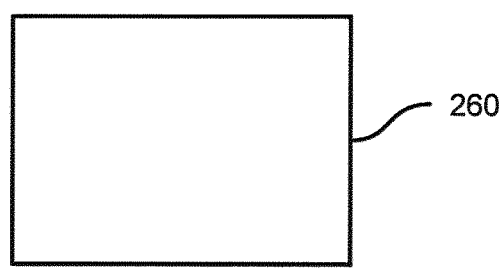
FIG. 2B is a schematic diagram illustrating a shape associated with the foam material according to another embodiment of the present invention.

The foam material 200 includes central sections 210 and 230, with extension section 220 disposed therebetween. An end section 240 is also illustrated. In the illustrated embodiment, the width (measured in the vertical direction as illustrated in FIG. 2B) of the extension section 220 and the end section 240 are equal although this is not required by the present invention. Referring once again to FIG. 1, the dimensions of the foam material 200 are correlated with the heat seal pattern 110 such that the foam material substantially fills the sealed portions of the metalized film after heat sealing. Accordingly, extension section 220 corresponds to extension sections 140

FIG. 2B is a schematic diagram illustrating a shape associated with the foam material according to another embodiment of the present invention. In the embodiment illustrated in FIG. 2B, a foam material 260 suitable for a pouch such as a flat pouch is shown. Thus, embodiments of the present invention utilize foam materials of varying shape depending on the particular final shape of the insulated bag that is desired.

Figure 3:
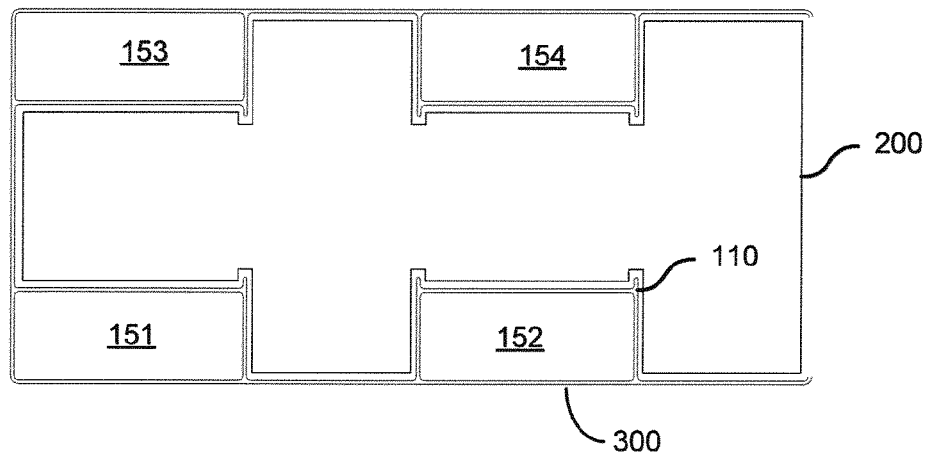
FIG. 3 is a schematic diagram illustrating insertion of a foam material into the film illustrated in FIG. 1.

FIG. 3 is a schematic diagram illustrating insertion of a foam material into the film illustrated in FIG. 1. As illustrated in FIG. 3, the foam material 200 shown in FIG. 2A is inserted into a metalized bag 310, which is a rectangular structure with an open end on the right hand side of the figure that's surrounding the foam material 200 in this particular embodiment. In addition to the rectangular (with rounded corners in this embodiment) metalized bag 300, FIG. 3 also illustrates heat sealing pattern 110. Additionally, regions 151, 152, 153, and 154 that can be cut out after heat sealing are also illustrated.

In an embodiment, a metalized Surlyn film is utilized. Surlyn is a flexible packaging resin available from Dupont. Surlyn is metalized on one or both sides for use in embodiments of the present invention. In other embodiments, a metalized polymer film that is sealable on the metalized surface is utilized in place of the Surlyn and the description related to Surlyn can be applied as well to these metalized polymer films. One of ordinary skill in the art would recognize many variations, modifications, and alternatives.

In an embodiment, a coextrusion of polyethylene (PE) facing out and an Ethylene Vinyl Alcohol (EVOH) barrier is utilized. This structure enables the use of a gas (e.g., argon) to inject the foam and release the shape of the foam into an expanded shape. Gases other than argon can be used as will be evident to one of skill in the art. Additional layers can be included in the coextrusion including Surlyn or another suitable metalized polymer, metallization layers, and adhesive layers to bond the various materials in the structure. The Surlyn can be used as a substrate material for the metallization layer(s), which will be facing inward in some implementations. In some embodiments, the foam can be inserted and then the heat seal pattern can be applied.

The heat sealing will entrap the foam between the layers of the metalized bag, constricting the motion of the foam with respect to the bag, but still enabling the foam to slide a predetermined distance laterally as suitable for applications.

Figure 4:
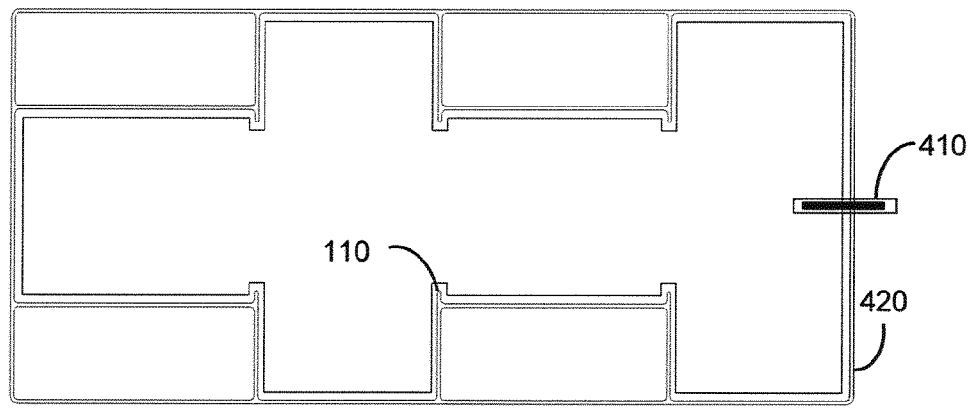
FIG. 4 is a schematic diagram illustrating insertion of a vacuum release port and a heat seal pattern used to close the container according to an embodiment of the present invention.

FIG. 4 is a schematic diagram illustrating insertion of a vacuum release port and a heat seal pattern used to close the container according to an embodiment of the present invention. In the illustrated embodiment, a vacuum release port (e.g., a valve) 410, which can also be referred to as a vacuum release point, is inserted and the metalized bag 300 is heat sealed using heat seal pattern 420 to close the shape. The heat seal pattern 420 joins the right hand side of the shapes associated with both the metalized bag 300 (rectangular) and the heat seal pattern 110. Although the vacuum release port is illustrated on the right portion of the perimeter of the bag, it should be appreciated that the valve can be positioned at any point on the perimeter seal as appropriate to the particular application.

In the illustrated embodiment, the vacuum release port 410 provides a mechanism to vacuum the air from inside the foam, reducing the thickness of the foam during shipping prior to use. The foam will thus be compressed during shipping, reducing freight costs. Referring to FIG. 4, the interior area defined by the heat seal pattern 110 and heat seal pattern 420 is defined by a continuous periphery and can be evacuated (i.e., a reduced pressure environment can be created) and then sealed using the vacuum release port 410.

Figure 5:
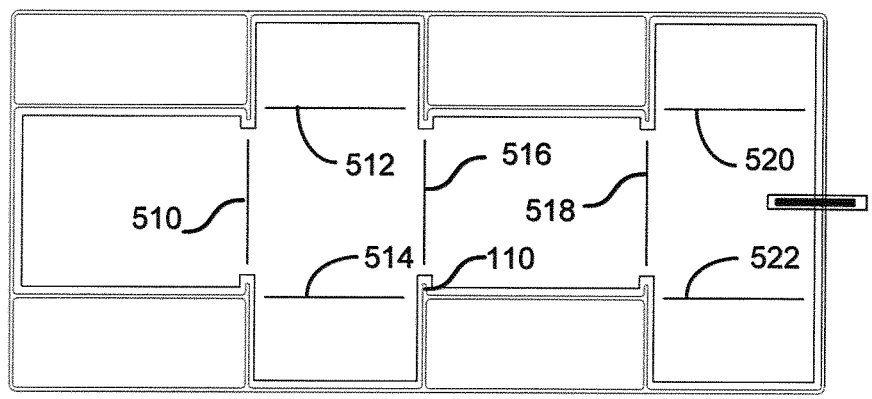
FIG. 5 is a schematic diagram illustrating heat seals operable to form folding points/lines according to an embodiment of the present invention.

FIG. 5 is a schematic diagram illustrating heat seals operable to form folding points/lines according to an embodiment of the present invention. Prior to removing the air from inside the foam, strategic heat seals 510, 512, 514, 516, 518, 520, and 522 for folding points/lines are formed to facilitate folding of the structure inside or into a box once ready for use. Then, the air inside the foam can be removed (e.g., by vacuum) to reduce the size of the structure during transport. As will be evident upon review of FIG. 5, spatial gaps separate heat seals 510, 512, 514, 516, 518, 520, and 522 from heat seal 110, such that heat seals 510, 512, 514, 516, 518, 520, and 522 do not impair the ability to remove air from inside the foam during compression prior to shipping as described in relation to FIG. 4.

The folding points/lines illustrated in FIG. 5, like the previous heat seals, join the metal layers bonded to the substrate (e.g., Surlyn). This contrasts with conventional structures in which metal layers face outside because they cannot be sealed together. Utilizing metal layers bonded to Surlyn and facing each other on the inside surfaces of the bag, a metal-to-metal bond is formed in some embodiments.

In an embodiment, after the user receives the insulated container, the valve is opened or placed under pressure to re-expand the foam material to the original or an increased thickness compared to the thickness during shipping. The foam material may be filled with gases other than air including argon, xenon, nitrogen, carbon dioxide, or the like. The insulated container can be inserted into a cardboard or other suitable box, providing thermal insulation for materials contained in the box.

Referring again to FIG. 5, after vacuuming of the air from inside the bag, the bag can be sealed to contain the vacuum, for example by heat sealing the right edge of the bag as illustrated in FIG. 5. Thus, the bag can retain the collapsed or compressed state during shipping.

Figure 6:
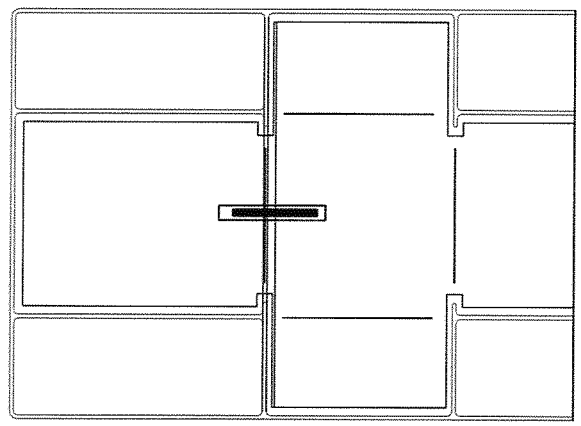
FIG. 6 is a schematic diagram illustrating folding of the container to form a bag according to an embodiment of the present invention.

FIG. 6 is a schematic diagram illustrating folding of the container to form a bag according to an embodiment of the present invention. As illustrated in FIG. 6, the bag has been folded over to place a right-hand portion of the bag over the middle portion of the bag. In an embodiment, the bag is folded to side seal the two opposite sides to form a bag.

As described herein, the end user is able to regain the original shape/thickness of the foam by just using air by inserting a hollow tube inside the valve, allowing the thickness to come back to ½", ¾", 1", 1.5", or the like. Additionally, the end user is able to regain the original shape/thickness of the foam for increased insulating thermal performance by inserting a nozzle attached to compressed gas (e.g., argon) tank, inflating the bag to a specified volume of gas, thereby enabling the thickness to come back to ½", ¾", 1", 1.5", or the like.

Figure 7:
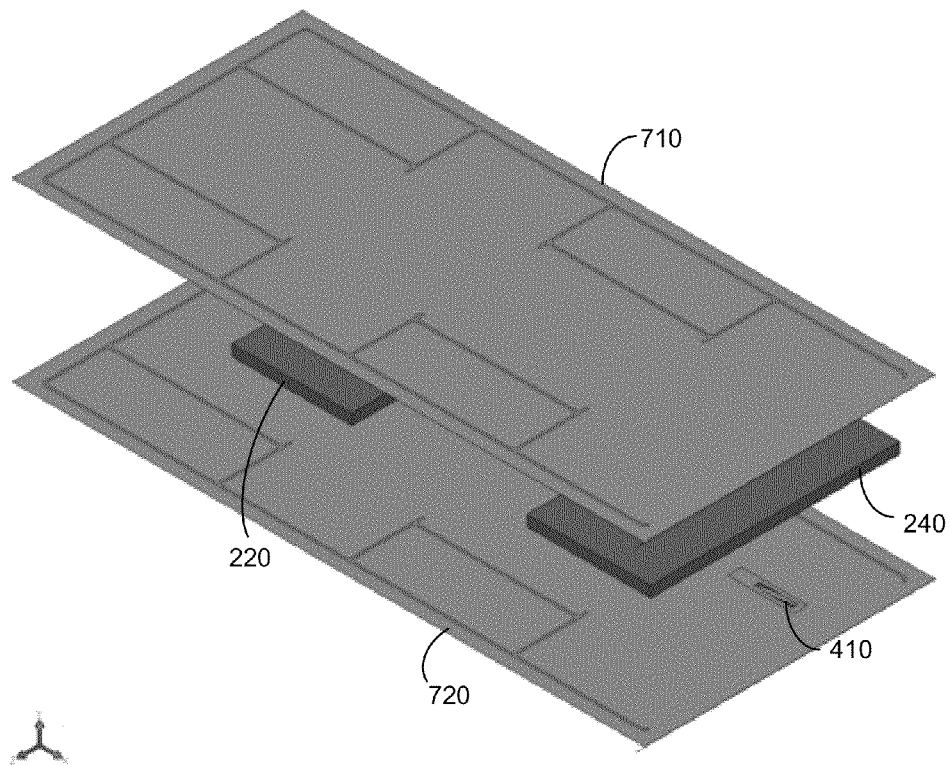
FIG. 7 is a perspective diagram illustrating elements of the insulated container according to an embodiment of the present invention.

FIG. 7 is a perspective diagram illustrating elements of the insulated container according to an embodiment of the present invention. As illustrated in FIG. 7, laminated structures are placed on either side of a foam material layer (with a portion of extension section 220 and a portion of end section 240 illustrated), with the metal surfaces of the laminated structures facing each other (the surfaces adjacent the foam material). As an example, laminated structures 710 can be (from the top to the bottom) polyethylene (PE)/Ethylene Vinyl Alcohol (EVOH) barrier/Surlyn/metal layer. Laminated structure 720 can utilize the same material structure, with the Surlyn on the face adjacent the foam material and the PE on the opposing face (facing down). The valve 410 is also placed between the laminated structures, for example, between the foam material layer and the lower laminated structure.

Figure 8:
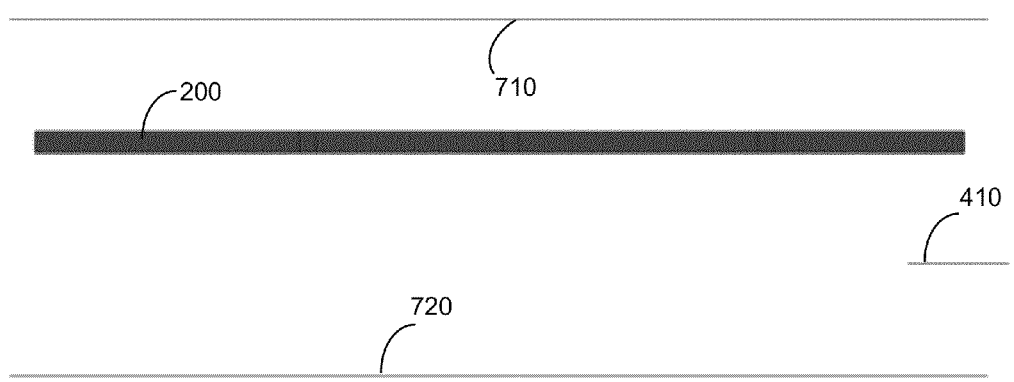
FIG. 8 is a cross-sectional diagram illustrating elements of the insulated container according to an embodiment of the present invention.

FIG. 8 is a cross-sectional diagram illustrating elements of the insulated container according to an embodiment of the present invention. The cross-sectional view shows the top laminated structure 710, with an inner film (the top film that will form the interior portions of the bag after folding into a box shape). The inner film, which is a laminated structure, can include a high melting point polymer side (the top side) and a metalized side (the bottom side), which can be formed on an adjacent Surlyn layer. A corresponding laminated structure 720 is also illustrated. The foam material 200 or any suitable porous material and the valve 410 are disposed between the two laminated structures. The lower laminated structure can be referred to as an outer film since it will form the outside portion of the bag once folded into a box shape and can be next to a box in which the folded bag is placed. The lower laminated structure includes an inner metalized layer and an outer film layer that can include a high melting point polymer that can be printed on or metalized as appropriate to the particular application.

Figure 9:
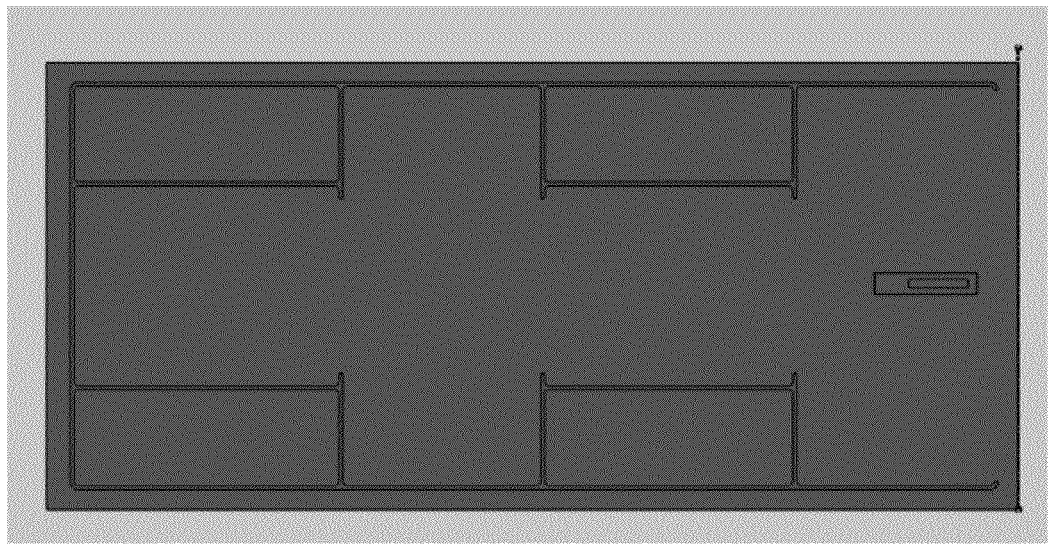
FIG. 9 is a plan view of the insulated container according to an embodiment of the present invention.

FIG. 9 is a plan view of the insulated container according to an embodiment of the present invention. A hole can be cut on the outer film underneath the valve to allow for air flow into and out of the foam material as described herein.

Figure 10:
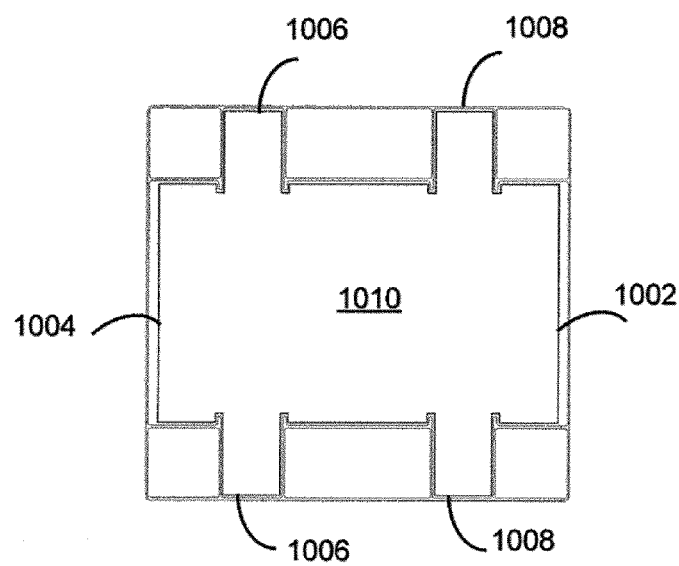
FIG. 10 is a schematic diagram illustrating an alternative shape for the insulated container according to an embodiment of the present invention.

FIG. 10 is a schematic diagram illustrating an alternative shape for the insulated container according to an embodiment of the present invention. In the alternative shape illustrated in FIG. 10, a symmetric box is provided with the ends 1002, 1004 forming the top flaps of the box, the vertical extensions 1006, 1008 forming the ends and sides, and the middle 1010 forming the bottom of the box. Other shapes are included within the scope of the present invention and this shape is merely provided by way of example.

Figure 11A:
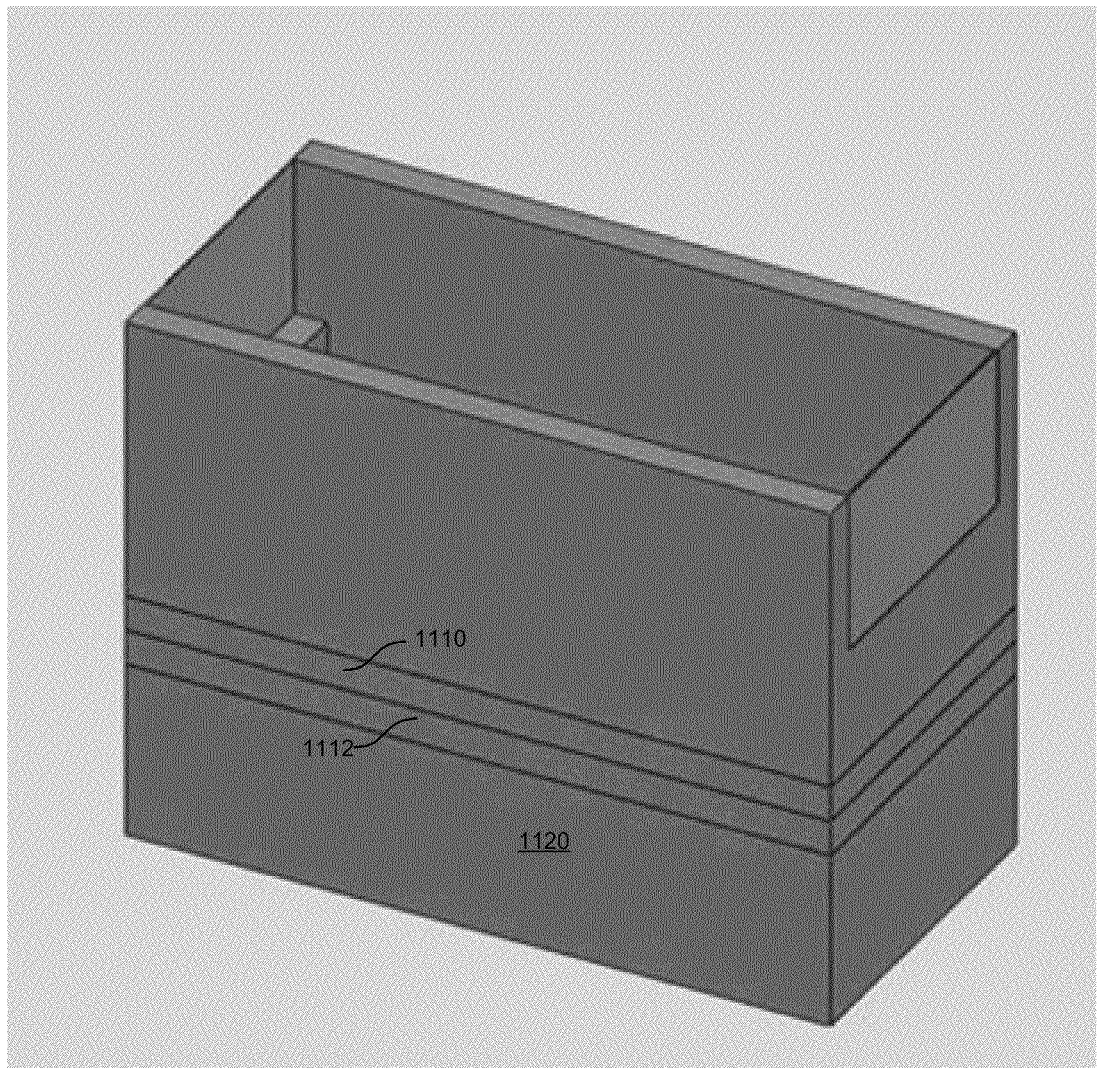
FIG. 11A is a perspective diagram illustrating a stackable insulated structure according to an embodiment of the present invention.

FIG. 11A is a perspective diagram illustrating a stackable insulated structure according to an embodiment of the present invention. As illustrated in FIG. 11A, a user can change the size of the cooler box in height by adding one or more rings 1110 and 1112 formed using embodiments of the present invention. Although only two rings 1110 and 1112 are illustrated, embodiments of the present invention can utilize a single ring or more than two rings. One of ordinary skill in the art would recognize many variations, modifications, and alternatives. In these embodiments, in addition to the box shapes, rings can be fabricated with laminated structures and foam material. A thicker ring 1120 is also illustrated that can include a bottom for the box structure.

Figure 11B:
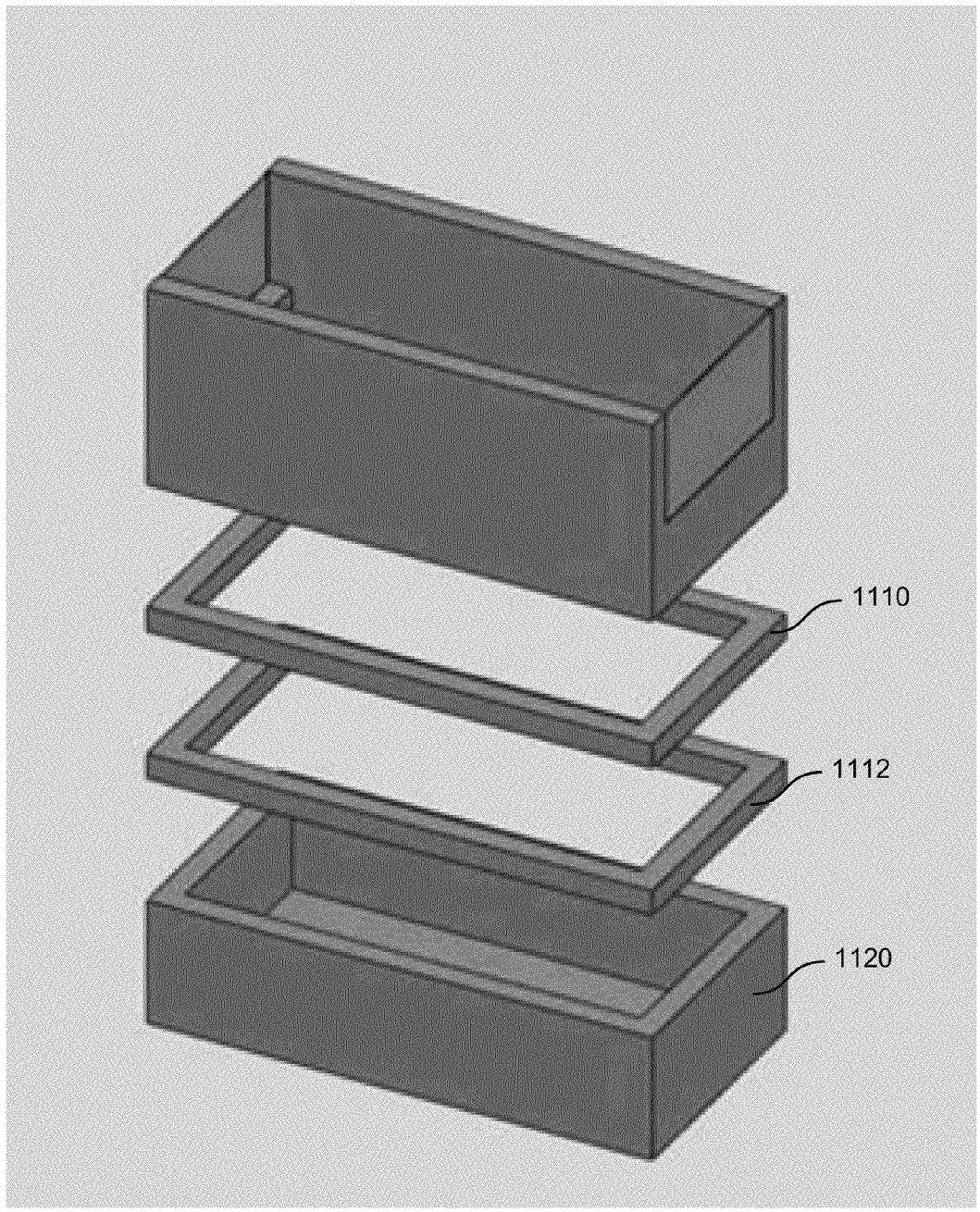
FIG. 11B is a perspective exploded view of the stackable insulated structure illustrated in FIG. 11A.

FIG. 11B is a perspective exploded view of the stackable insulated structure illustrated in FIG. 11A.

Figure 12:
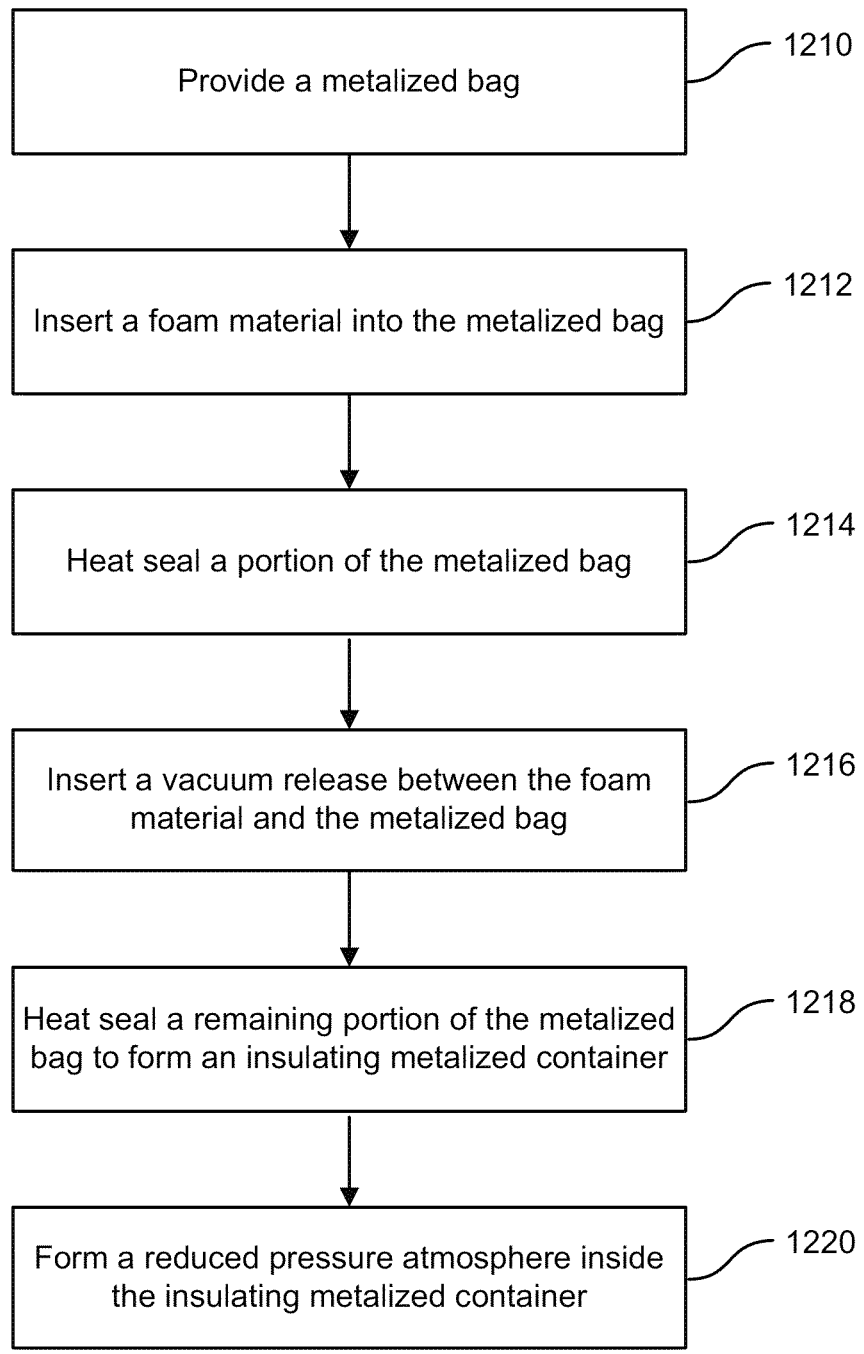
FIG. 12 is a simplified flowchart illustrating a method of fabricating an insulated metalized container according to an embodiment of the present invention.

FIG. 12 is a simplified flowchart illustrating a method of fabricating an insulated metalized container (also referred to as a metalized bag) according to an embodiment of the present invention. The method includes providing a metalized bag comprising a laminated material including an outer layer and an inner layer comprising a metal layer (1210), inserting a foam material into the metalized bag (1212), and heat sealing a portion of the metalized bag using a heat seal pattern (1214). The laminated material can include at least one polymer layer (e.g., Surlyn) and a metal layer.

The method also includes inserting a vacuum release port between the foam material and the metalized bag (1216) and heat sealing a remaining portion of the metalized bag to form the insulating metalized container (1218). As illustrated in FIG. 4, the portion of the metalized bag and the remaining portion of the metalized bag define the periphery of the metalized bag in some embodiments. In other embodiments, there is some overlap in the heat seals so that some areas of the metalized bag are heat sealed more than once. One of ordinary skill in the art would recognize many variations, modifications, and alternatives.

The method further includes forming a reduced pressure environment inside the insulating metalized container (1220). In some embodiments, forming the reduced pressure environment results in the foam material decreasing in thickness as air is evacuated from the interior region of the insulating metalized container. After shipment, the foam material in the insulating metalized container can be expanded in response to inserting a hollow tube inside the vacuum release port, which enables air or other suitable gases to enter the foam material.

It should be appreciated that the specific steps illustrated in FIG. 12 provide a particular method of fabricating an insulated metalized container according to an embodiment of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An insulated container comprising:
   a first laminated structure having a metal layer;
   a second laminated structure having a metal layer, wherein the metal layer of the first laminated structure faces the metal layer of the second laminated structure; and
   a foam material layer disposed between the first laminated structure and the second laminated structure, wherein the metal layer of the first laminated structure is bonded to the metal layer of the second laminated structure at a plurality of locations.

2. The insulated container of claim 1 wherein the plurality of locations comprise a plurality of lines.

3. The insulated container of claim 1 wherein the first laminated structure comprises a Surlyn layer bonded to the metal layer of the first laminated structure and the second laminated layer comprises a Surlyn layer bonded to the metal layer of the second laminated structure.

4. The insulated container of claim 1 further comprising a release port in fluid communication with the foam material layer.

5. The insulated container of claim 4 wherein the release port is disposed between the first laminated structure and the second laminated structure.

6. A method of fabricating an insulated metalized container, the method comprising:
   providing a metalized bag comprising a laminated material including an outer layer and an inner layer comprising a metal layer;
   inserting a foam material into the metalized bag;
   heat sealing a portion of the metalized bag using a heat seal pattern;
   inserting a vacuum release port between the foam material and the metalized bag;
   heat sealing a remaining portion of the metalized bag to form the insulating metalized container; and
   forming a reduced pressure environment inside the insulating metalized container.

7. The method of claim 6 wherein forming the reduced pressure environment results in the foam material decreasing in thickness.

8. The method of claim 6 further comprising expanding the foam material in the insulating metalized container in response to inserting a hollow tube inside the vacuum release port.

9. The method of claim 6 wherein the portion of the metalized bag and the remaining portion of the metalized bag define the periphery of the metalized bag.

10. The method of claim 6 wherein the laminated material comprises at least one polymer layer and a metal layer.

11. The method of claim 10 wherein the at least one polymer layer comprises Surlyn.

* * * * *